United States Patent [19]
Brown

[11] Patent Number: 5,983,786
[45] Date of Patent: Nov. 16, 1999

[54] FOOD PAN FOR PLACING ON THE GRATES OF A BARBECUE GRILL

[76] Inventor: Cynthia Brown, 223 E. Cedar, P.O. Box 1009, Carnegie, Okla. 73015

[21] Appl. No.: 09/090,136

[22] Filed: Jun. 4, 1998

[51] Int. Cl.⁶ ............................. A47J 27/00; A47J 37/04; A47J 37/12; A47J 43/00
[52] U.S. Cl. ............................. 99/426; 99/400; 99/446; 99/450
[58] Field of Search ................. 99/400, 401, 426, 99/427, 444–446, 447–450, 413, 425; 248/174; 249/119, 120; 211/14, 13.1, 60.1; 126/348; D7/355, 359, 409; 220/409, 428

[56] References Cited

U.S. PATENT DOCUMENTS

| | | | |
|---|---|---|---|
| 961,474 | 6/1910 | Allsopp | 99/450 X |
| 2,216,457 | 10/1940 | Salisbury | 99/450 X |
| 2,397,410 | 3/1946 | Deacon | 99/340 |
| 3,199,438 | 8/1965 | Myler et al. | 99/421 R |
| 3,548,736 | 12/1970 | Wahl, Jr. | 99/450 X |
| 3,722,402 | 3/1973 | Plumley | 99/467 |
| 4,941,401 | 7/1990 | Sarnoff et al. | 99/446 |
| 5,363,751 | 11/1994 | Prestigiacomo | 99/444 |
| 5,467,691 | 11/1995 | Koziol | 99/340 |
| 5,839,361 | 11/1998 | Richter | 99/422 |
| 5,870,946 | 2/1999 | Dudley | 99/426 |

*Primary Examiner*—Timothy Simone

[57] ABSTRACT

A new food pan for placing on the grates of a barbecue grill for permitting grilling of small foods which would otherwise fall through the grates of a grill. The inventive device includes a plate member that has a pair of ends, a pair of sides that extend between the ends, and upper and lower surfaces. A plurality of apertures extend through the upper and lower surfaces of the plate member to permit heat and smoke to reach food placed on the plate member. The apertures are arranged in a grid-like fashion having a plurality of columns and rows. The columns extend between the ends of the plate member. The rows extend between the sides of the plate member.

10 Claims, 2 Drawing Sheets

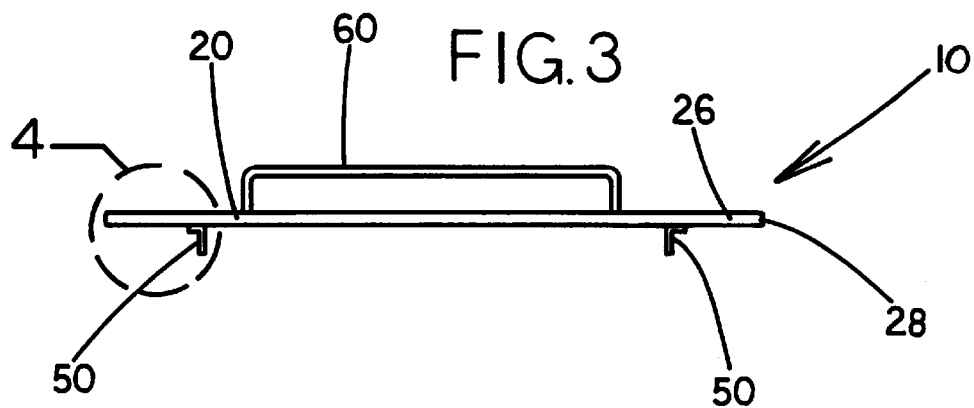
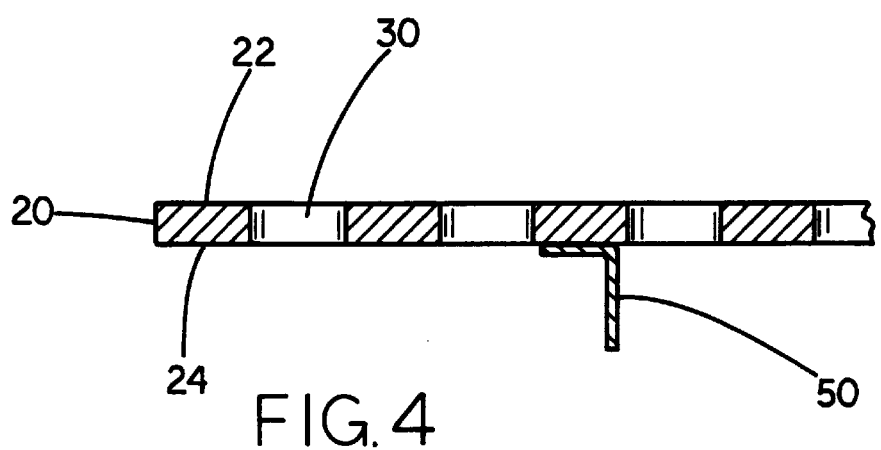

FOOD PAN FOR PLACING ON THE GRATES OF A BARBECUE GRILL

BACKGROUND OF THE INVENTION

1. Field of the Invention

The present invention relates to grill pans and more particularly pertains to a new food pan for placing on the grates of a barbecue grill for permitting grilling of small foods which would otherwise fall through the grates of a grill.

2. Description of the Prior Art

The use of grill pans is known in the prior art. More specifically, grill pans heretofore devised and utilized are known to consist basically of familiar, expected and obvious structural configurations, notwithstanding the myriad of designs encompassed by the crowded prior art which have been developed for the fulfillment of countless objectives and requirements.

Known prior art grill pans include U.S. Pat. No. 5,211,105; U.S. Pat. No. 5,237,914; U.S. Pat. No. Des. 246,751; U.S. Pat. No. 4,598,634; U.S. Pat. No. 5,447,097; and U.S. Pat. No. 5,355,779.

While these devices fulfill their respective, particular objectives and requirements, the aforementioned patents do not disclose a new food pan for placing on the grates of a barbecue grill. The inventive device includes a plate member that has a pair of ends, a pair of sides that extend between the ends, and upper and lower surfaces. A plurality of apertures extend through the upper and lower surfaces of the plate member to permit heat and smoke to reach food placed on the plate member. The apertures are arranged in a grid-like fashion having a plurality of columns and rows. The columns extend between the ends of the plate member. The rows extend between the sides of the plate member.

In these respects, the food pan for placing on the grates of a barbecue grill according to the present invention substantially departs from the conventional concepts and designs of the prior art, and in so doing provides an apparatus primarily developed for the purpose of permitting grilling of small foods which would otherwise fall through the grates of a grill.

SUMMARY OF THE INVENTION

In view of the foregoing disadvantages inherent in the known types of grill pans now present in the prior art, the present invention provides a new food pan for placing on the grates of a barbecue grill construction wherein the same can be utilized for permitting grilling of small foods which would otherwise fall through the grates of a grill.

The general purpose of the present invention, which will be described subsequently in greater detail, is to provide a new food pan for placing on the grates of a barbecue grill apparatus and method which has many of the advantages of the grill pans mentioned heretofore and many novel features that result in a new food pan for placing on the grates of a barbecue grill which is not anticipated, rendered obvious, suggested, or even implied by any of the prior art grill pans, either alone or in any combination thereof.

To attain this, the present invention generally comprises a plate member that has a pair of ends, a pair of sides that extend between the ends, and upper and lower surfaces. A plurality of apertures extend through the upper and lower surfaces of the plate member to permit heat and smoke to reach food placed on the plate member. The apertures are arranged in a grid-like fashion having a plurality of columns and rows. The columns extend between the ends of the plate member. The rows extend between the sides of the plate member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new food pan for placing on the grates of a barbecue grill apparatus and method which has many of the advantages of the grill pans mentioned heretofore and many novel features that result in a new food pan for placing on the grates of a barbecue grill which is not anticipated, rendered obvious, suggested, or even implied by any of the prior art grill pans, either alone or in any combination thereof.

It is another object of the present invention to provide a new food pan for placing on the grates of a barbecue grill which may be easily and efficiently manufactured and marketed.

It is a further object of the present invention to provide a new food pan for placing on the grates of a barbecue grill which is of a durable and reliable construction.

An even further object of the present invention is to provide a new food pan for placing on the grates of a barbecue grill which is susceptible of a low cost of manufacture with regard to both materials and labor, and which accordingly is then susceptible of low prices of sale to the consuming public, thereby making such food pan for placing on the grates of a barbecue grill economically available to the buying public.

Still yet another object of the present invention is to provide a new food pan for placing on the grates of a barbecue grill which provides in the apparatuses and methods of the prior art some of the advantages thereof, while simultaneously overcoming some of the disadvantages normally associated therewith.

Still another object of the present invention is to provide a new food pan for placing on the grates of a barbecue grill for permitting grilling of small foods which would otherwise fall through the grates of a grill.

Yet another object of the present invention is to provide a new food pan for placing on the grates of a barbecue grill which includes a plate member that has a pair of ends, a pair of sides that extend between the ends, and upper and lower surfaces. A plurality of apertures extend through the upper and lower surfaces of the plate member to permit heat and smoke to reach food placed on the plate member. The apertures are arranged in a grid-like fashion having a plurality of columns and rows. The columns extend between the ends of the plate member. The rows extend between the sides of the plate member.

Still yet another object of the present invention is to provide a new food pan for placing on the grates of a barbecue grill that includes a plurality of apertures that permit heat and smoke to pass through the food pan and reach food that is placed on the food pan.

Even still another object of the present invention is to provide a new food pan for placing on the grates of a barbecue grill that is more easy to clean than a conventional grill grate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention taken from Line 3—3 of FIG. 1.

FIG. 4 is a detailed cross-sectional view of the present invention taken from Circle 4 of FIG. 3.

DESCRIPTION OF THE PREFERRED EMBODIMENT

Figure 1:
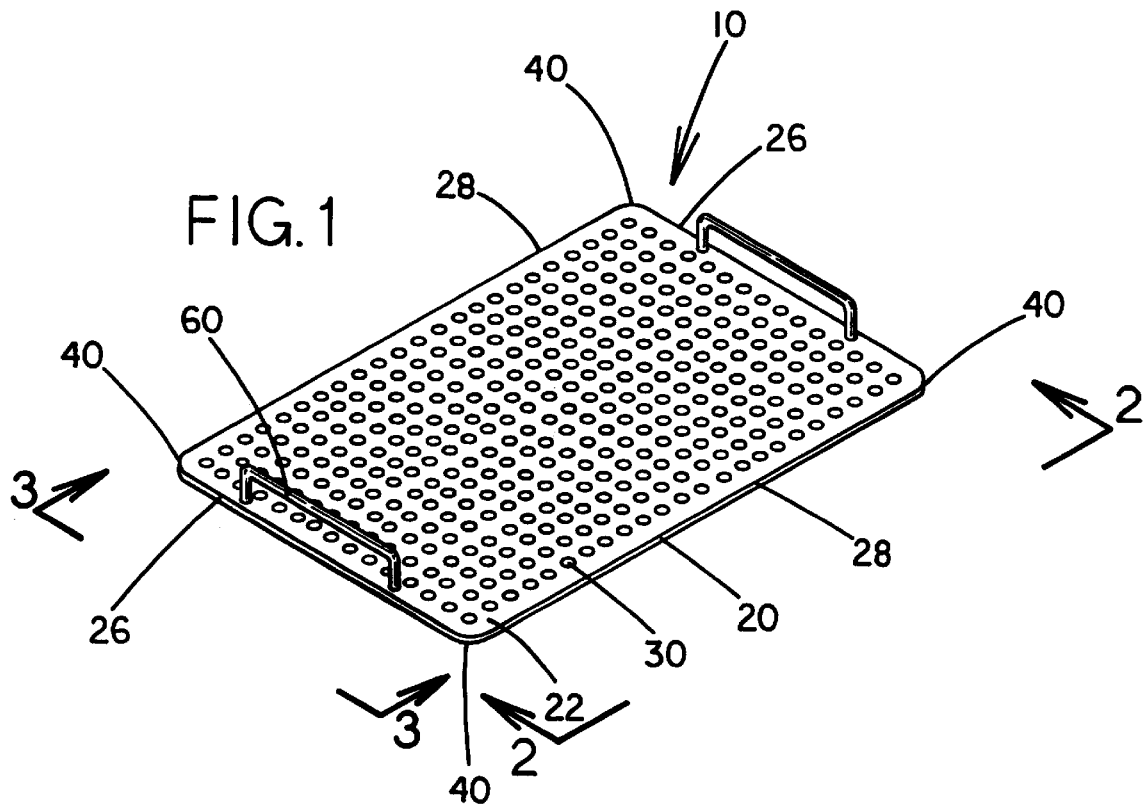
FIG. 1 is a perspective view of a new food pan for placing on the grates of a barbecue grill according to the present invention.
Figure 2:
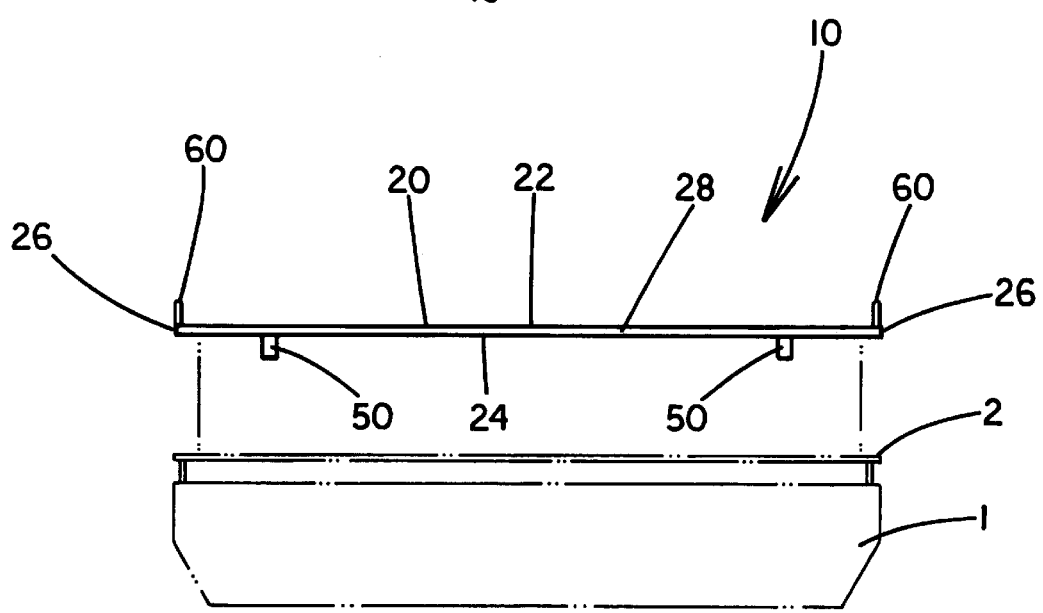
FIG. 2 is a side view of the present invention taken from Line 2—2 of FIG. 1.

With reference now to the drawings, and in particular to FIGS. 1 through 4 thereof, a new food pan for placing on the grates of a barbecue grill embodying the principles and concepts of the present invention and generally designated by the reference numeral 10 will be described.

As best illustrated in FIGS. 1 through 4, the food pan 10 for placing on the grates 2 of a barbecue grill 1 comprises a plate member 20 that has a pair of ends 26, a pair of sides 28 that extend between the ends 26, and upper and lower surfaces 22,24. The plate member 20 has a plurality of apertures 30 extending through the upper and lower surfaces 22,24 of the plate member 20. The apertures 30 are arranged in a grid-like fashion having a plurality of columns and rows. The columns extend between the ends 26 of the plate member 20. The rows extend between the sides 28 of the plate member 20.

Preferably, the plate member 20 is generally rectangular in shape. Ideally, the upper and lower surfaces 22,24 of the plate member 20 are substantially planar and the distance between the upper and lower surfaces 22,24 is about less than one-eighths inch. Also ideally, the ends 26 are generally straight and are about fourteen inches long. The sides 28 are generally straight and about twenty inches long. Alternatively, the sides 28 and ends 26 may be about twelve inches long to form a substantially square model that covers only about half of the grates of a large grill.

Preferably, the plate member 20 has a length defined between the ends 26 of the plate member 20 and a width defined between the sides 28 of the plate member 20. Preferably, the width of the plate member 20 is less than about five-sixths the length of the plate member 20. Even more preferably, the width of the plate member 20 is less than about 15 inches.

As shown in FIG. 4, the apertures 30 extend through the upper and lower surfaces 22,24 of the plate member 20. Preferably, as illustrated in FIG. 1, each of the apertures 30 is generally circular. Ideally, each of the apertures 30 has a diameter of less than about one-third inch so that relatively small pieces of food will not pass through the apertures 30. Most ideally, the apertures 30 have a diameter of one-quarter inch.

Preferably, as shown in FIG. 1, each of the columns of apertures 30 is spaced less than about one-third inch apart from another of the columns. Also preferably, each of the rows of apertures 30 is spaced less than about one-third inch apart from another of the rows. Such spacing of the rows and columns permits more even heat distribution. Ideally, each the columns are spaced about one-quarter inch apart from another of the columns. Also ideally, each of the rows are spaced about one-quarter inch apart from another of the rows.

Preferably, the food pan 10 further comprises a plurality of corners 40. A corner 40 is formed at each intersection of an end 26 and a side 28 of the plate member 20. Even more preferably, the corners 40 are rounded for safety.

Also preferably, the food pan 10 further comprises a plurality of feet 50 that downwardly depend from the lower surface 24 of the plate member 20. Even more preferably, four feet 50 depend from the lower surface 24 of the plate member 20 and each of the feet 50 is positioned towards an associated corner 40 of the food pan 10. Ideally, each of the feet 50 is spaced between about one inch and about four inches from an associated corner 40. The feet 50 are for insertion between the grates 2 of a grill 1 to prevent the food pan 10 from sliding around on the grill 1. The feet 50 also hold the plate member 20 in a spaced apart relation from a surface after the food pan 10 is removed from the grill 1 to prevent burning and soiling of the surface.

Preferably, a pair of handle members 60 extend from the upper surface 22 of the plate member 20. Each of the handle members 60 is positioned adjacent a respective end 26 of the plate member 20. Ideally, the handle members 60 are generally U-shaped.

In use, the food pan 10 is placed on the grates 2 of a barbecue grill 1 with the feet 50 extending between the grates 2 of the grill 1. Food is placed on the upper surface 22 of the plate member 20 for cooking. Smoke and heat pass through the apertures 30 to cook and flavor the food. The food pan 10 may be removed from the grill 1 and placed on a surface with the feet 50 holding the plate member 20 above the surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food pan for placing on the grates of a barbecue grill, said food pan comprising:
    a plate member having a pair of ends, a pair of sides extending between said ends of said plate member, and upper and lower surfaces;
    wherein said plate member has a plurality of apertures extending through said upper and lower surfaces of said plate member, said apertures being arranged in a grid-like fashion having a plurality of columns and rows, said columns being extended between said ends of said plate member, said rows being extended between said sides of said plate member;
    a plurality of corners, a said corner being formed at each intersection of an end and a side, wherein said corners of said plate member are rounded; and
    a plurality of feet downwardly depending from said lower surface of said plate member, each of said feet being positioned towards an associated corner.

2. The food pan of claim 1, wherein said plate member has a length defined between said ends of said plate member and a width defined between said sides of said plate member, wherein said width of said plate member is less than about five-sixths said length of said plate member.

3. The food pan of claim 1, wherein said width of said plate member is less than about 15 inches.

4. The food pan of claim 1, wherein each of said apertures is generally circular.

5. The food pan of claim 4, wherein each of said apertures has a diameter of less than about one-third inch.

6. The food pan of claim 1, wherein each of said columns of apertures is spaced less than about one-third inch apart from another of said columns.

7. The food pan of claim 1, wherein each of said rows of apertures is spaced less than about one-third inch apart from another of said rows.

8. The food pan of claim 1, wherein each of said feet is spaced between about one inch and about four inches from an associated corner.

9. The food pan of claim 1, further comprising a pair of handle members being extended from said upper surface of said plate member, each of said handle members being positioned adjacent a respective said end of said plate member.

10. A food pan for placing on the grates of a barbecue grill, said food pan comprising:
    a plate member being generally rectangular and having a pair of ends, a pair of sides extending between said ends of said plate member, upper and lower surfaces, and a plurality of corners, a said corner being formed at each intersection of an end and a side, said upper and lower surfaces being substantially planar, said ends and sides being generally straight;
    wherein said plate member has a length defined between said ends of said plate member and a width defined between said sides of said plate member, wherein said width of said plate member is less than about five-sixths said length of said plate member, wherein said width of said plate member is less than about 15 inches;
    wherein said plate member has a plurality of apertures extending through said upper and lower surfaces of said plate member, said apertures being arranged in a grid-like fashion having a plurality of columns and rows, said columns being extended between said ends of said plate member, said rows being extended between said sides of said plate member;
    wherein each of said apertures is generally circular, each of said apertures having a diameter of less than about one-third inch;
    wherein each of said columns of apertures is spaced less than about one-third inch apart from another of said columns;
    wherein each of said rows of apertures is spaced less than about one-third inch apart from another of said rows;
    a plurality of feet downwardly depending from said lower surface of said plate member, each of said feet being positioned towards an associated corner, wherein each of said feet is spaced between about one inch and about four inches from an associated corner;
    wherein said corners of said plate member are rounded; and
    a pair of handle members being extended from said upper surface of said plate member, each of said handle members being positioned adjacent a respective said end of said plate member.

\* \* \* \* \*